Aug. 22, 1939.  E. A. LE BEAU  2,170,532
RAILWAY BRAKE GEAR DEVICE
Filed Aug. 12, 1938  2 Sheets-Sheet 1

INVENTOR
ERNEST A. LE BEAU
BY Rodney Bedell
ATTORNEY

Aug. 22, 1939.  E. A. LE BEAU  2,170,532
RAILWAY BRAKE GEAR DEVICE
Filed Aug. 12, 1938  2 Sheets-Sheet 2
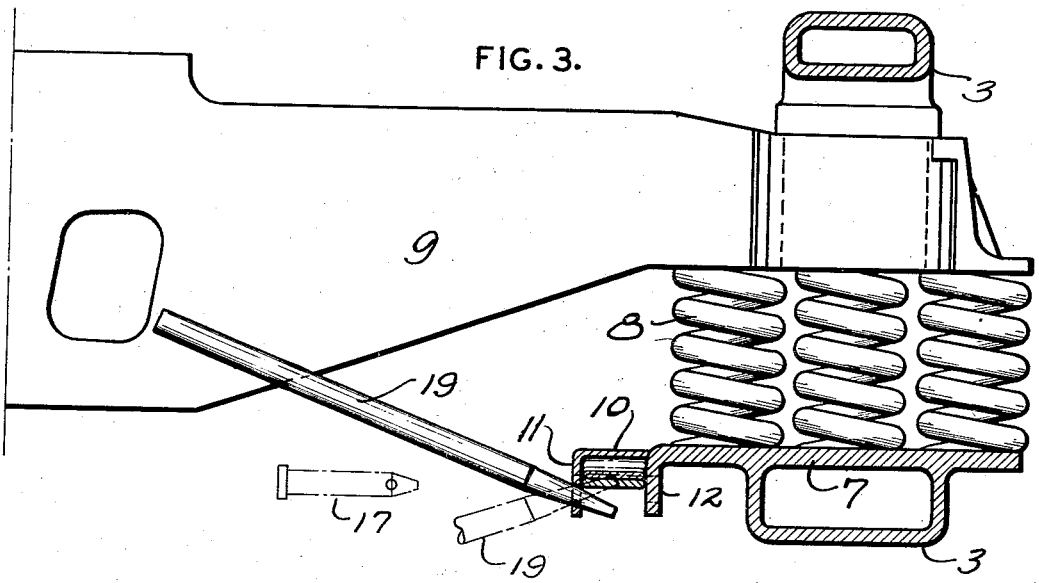
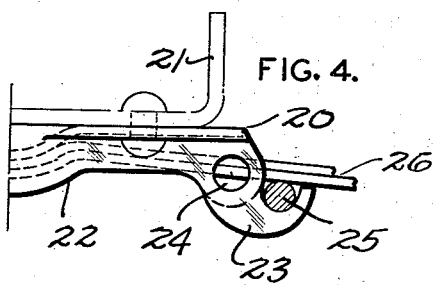
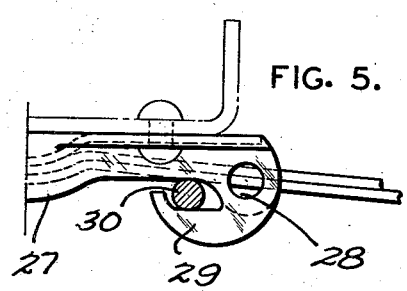
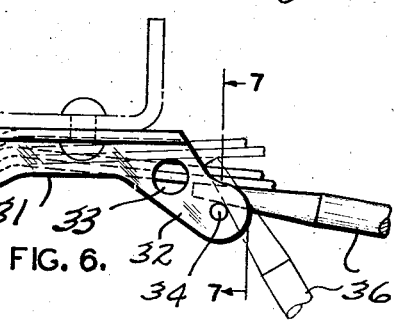
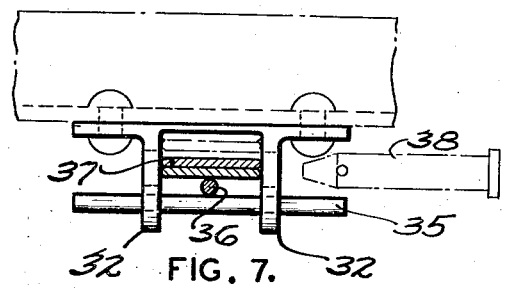
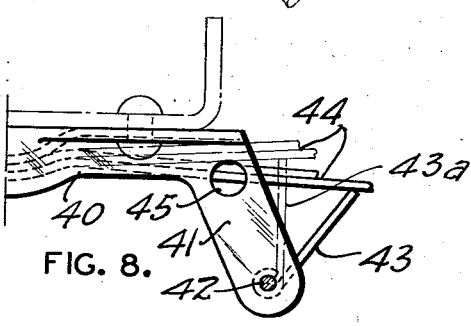
INVENTOR
ERNEST A. LE BEAU
BY Rodney Bedell
ATTORNEY

Patented Aug. 22, 1939

2,170,532

UNITED STATES PATENT OFFICE 2,170,532

RAILWAY BRAKE GEAR DEVICE

Ernest A. Le Beau, Chicago, Ill., assignor to Chicago Railway Equipment Company, Chicago, Ill., a corporation of Illinois Application August 12, 1938, Serial No. 224,444

9 Claims. (Cl. 188—210)

The invention relates to guard, guide, or support members for railway brake gear and consists in a structure for mounting the same upon a suitable truck part.

The main object of the invention is to facilitate the application and removal of the guard, guide, or support member to and from the truck part and, more specifically, to provide the mounting structure with means whereby resilient guard, guide, or support members may be readily distorted to free the retaining element.

These and other detailed objects of the invention will be better understood by the following description, reference being had to the accompanying drawings in which—

Figure 3 is a vertical transverse section taken on the line 3—3 of Figure 2 and showing the tool applied to the structure.

Figure 2:
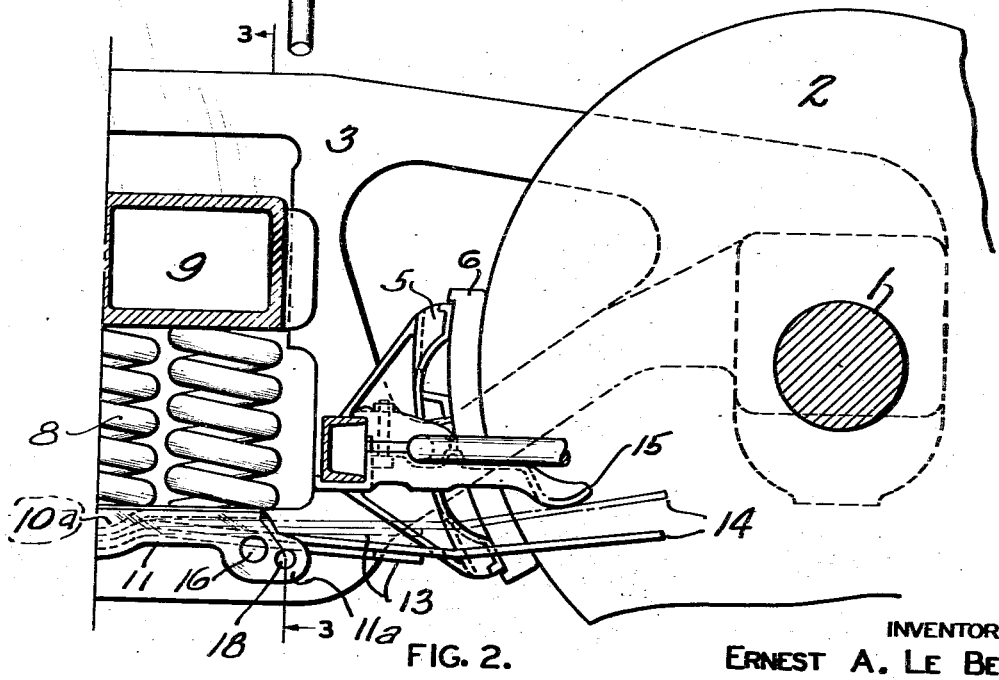
Figure 2 is a vertical longitudinal section taken approximately on the line 2—2 of Figure 1, the tool referred to above being omitted.

Figures 4, 5, 6, and 8 are detail views corresponding generally to the structure shown in Figure 2 but illustrating various forms of the invention.

Figure 7 is a view and section of the structure shown in Figure 6 and is taken on the line 7—7 of Figure 6.

The truck includes the usual axles 1, wheels 2, truck frame side members 3, and truss type brake beams 4, including the heads 5 and shoes 6 for application to the wheels. The truck frame includes a seat 7 for coil springs 8 supporting the truck bolster 9. Spring seat 7 is provided with an inward extension 10 having a depending flange 11, and this extension cooperates with the depending flange 12 on the spring seat to form a downwardly facing channel-shaped bracket receiving the brake beam guard, guide, or support device hereinafter referred to as the safety member.

This device includes a relatively short bar 13 and a relatively long bar 14, preferably of spring material, extending in opposite directions from the bracket under the brake beams and shaped to engage the brake beam chair 15 and guide it in its movement to and from the wheel. The bracket flanges 11 and 12 are apertured at 16 to receive a pin 17 which retains the safety member 13—14 in place. It will be understood that the elements of this member are originally shaped so that they tend to assume the full line position indicated in Figure 2 when their intermediate bowed portion is in contact with the corresponding portion 10a of the bracket, and they must be forced upwardly against their normal spring thrust to the dot and dash line functioning position in which they are held by the retaining pin.

This operation is effected by extending flange 11 a substantial distance beyond aperture 16 and providing the extended portion 11a with an opening 18 arranged to receive a pinch bar 19 so that the inner end of the same may underlie the safety member and the edge of opening 18 may serve as a fulcrum for using the bar as a lever to distort safety member 13—14 to the extent necessary to freely remove or insert pin 17.

Figure 4 illustrates an inverted channel-shape bracket 20 formed separately from and applied to a truck spring plank 21 and having one of its depending flanges 22 extended outwardly at 23 beyond the pin-receiving aperture 24 to form a hook-like element on which the lever 25 may be fulcrumed to manipulate the safety member 26.

Figure 5 illustrates a similar bracket in which the flange 27 extends inwardly beyond the pin receiving aperture 28 to form a hook fulcrum 29 for the member distorting lever 30.

Figures 6 and 7 illustrate a form of the invention in which both depending flanges 31 of the bracket have extensions 32 adjacent the pin receiving apertures 33, the extensions being perforated at 34 to receive a rod 35 which forms a fulcrum for the lever 36 which may be disposed lengthwise of the safety member 37 to distort the latter to facilitate insertion and removal of the retaining pin 38.

Figure 8 illustrates a form of the invention in which opposing bracket flanges 40 have extensions 41 seating a transverse rod 42 which pivotally mounts the member distorting tool 43 adapted to be thrust inwardly from the full line position to the broken line position at 43a to elevate the safety member 44 and clear the aperture 45 to facilitate the insertion and removal of the retaining pin (not shown).

The pressure necessary to force the spring elements 13—14 into assembling position may vary from 750# to 1250# and numerous clamps, jacks, peculiarly shaped levers, and other special equipment have been devised and used for this purpose. Frequently this equipment is not provided or may not be available at the time repairs are to be made, in which case the safety member may only be applied and removed with considerable difficulty. All shops and repair crews have pinch bars or plain rods corresponding to those illustrated in the drawings and by forming a support or fulcrum for these elements on the bracket, it will be a comparatively simple matter to distort the safety member and remove or reapply the retaining pin. Even the ordinary pinch bar will not be required with the arrangement shown in Figure 8 in which the tool is permanently mounted on the bracket.

Figure 1:
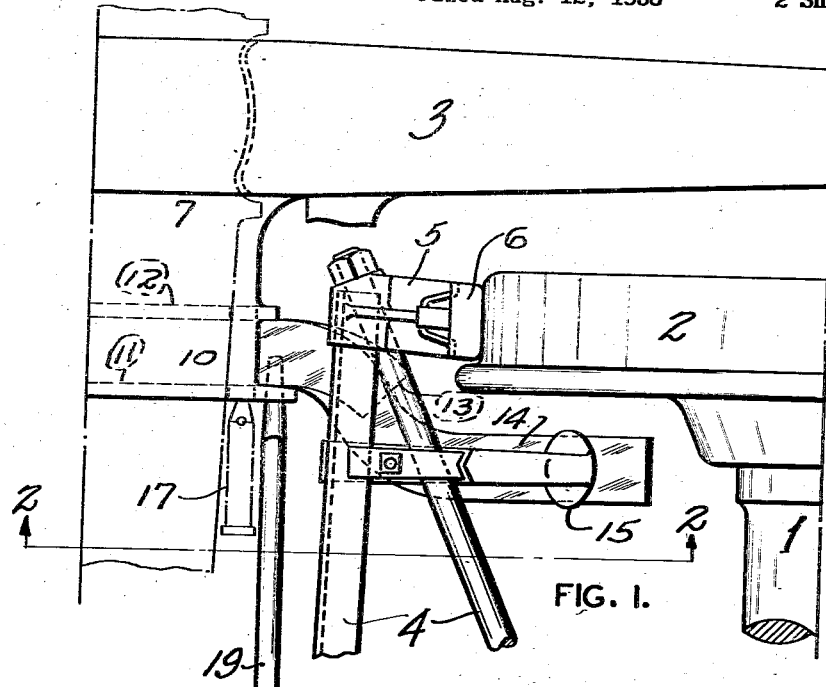
Figure 1 is a top view of a portion of a railway truck indicating one wheel and its axle, the adjacent truck frame, brake beam, brake beam support, and a tool to be used in applying and removing the support.

It will be understood that all forms of the invention may be embodied in a bracket formed integral with the side frame, as shown in Figures 1 to 3, or in a bracket attached to the side frame or the spring seat, or in a bracket arranged for application to the spring plank, or other suitable truck part as shown in Figures 4 to 8, and, obviously, the bracket may be utilized for a third point support near the longitudinal center line of the truck as well as for a fourth point support adjacent the end of the brake beam.

With the fairly simple spring support illustrated, it will be sufficient to provide the tool rest at one end of the bracket, but with some forms of safety devices having a different type of anchorage to the truck part it may be necessary or desirable to provide the tool rest or fulcrum at both ends of the bracket. Such variations and other modifications of the invention will suggest themselves to those skilled in the art according to the conditions which are to be met, and it is to be understood that the exclusive use of such modifications as come within the scope of the claims is contemplated.

What is claimed is:

1. In a device for mounting a railway brake beam safety device bar, a bracket, means mounted on the bracket for tightly engaging the bar to retain it in functioning position, the bracket having an element for supporting a tool by which the bar may be moved to disengage it from the retaining means to facilitate removal of the latter from the device.

2. In a bracket for mounting a railway brake beam safety device bar, spaced parts for receiving the safety bar between them, said parts including elements for mounting a bar engaging and retaining member, the bracket having means for supporting a tool by which the bar may be moved to disengage it from the retaining member to facilitate removal of the latter.

3. In a bracket for mounting a railway brake beam safety bar, an inverted channel-like section with its depending flanges disposed to receive the safety bar between them, said flanges having alined elements for mounting a bar positioning pin, and structure adjacent said elements forming a pivotal mounting for a tool by which said bar may be moved to free said pin and facilitate removal of said pin from the bracket.

4. In a bracket for mounting a railway brake beam safety bar, an inverted channel-like section with its depending flanges disposed to receive the safety bar between them, said flanges having alined elements for mounting a bar positioning pin and at least one of said flanges having an element constituting a fulcrum for a lever operable manually thereon to move said bar to facilitate insertion and removal of said pin.

5. In a bracket for mounting a railway brake beam safety bar, a channel-like bracket with depending flanges arranged to receive the brake beam safety bar between them, said flanges having alined apertures for mounting a bar positioning pin and one of said flanges being extended beyond the pin mounting aperture and forming a support for a tool whereby said bar may be distorted to facilitate insertion and removal of said pin.

6. In a bracket for mounting a railway brake beam safety bar, an inverted channel-like section with its depending flanges disposed to receive the safety bar between them, said flanges having alined apertures for mounting a bar positioning pin, and at least one of said legs having an opening adjacent to its pin-receiving aperture for receiving a lever with the edge of said opening constituting a fulcrum whereby said lever may move the adjacent portion of said bar to facilitate insertion and removal of said pin.

7. In a bracket for mounting a railway brake beam safety device bar, a pin extending transversely of the bracket body and seated in apertures therein and positioned to tightly engage the bar to retain it in functioning position, there being an aperture in said body adjacent to said pin and in which a pinch bar or like tool may be fulcrumed to move said safety bar from said pin.

8. In a bracket for mounting a railway brake beam safety bar, a channel-like bracket with depending flanges arranged to receive the safety bar between them, said flanges having alined apertures for mounting a bar positioning pin and one of said flanges providing a hook-like projection adjacent to the pin receiving aperture with a surface below the level of the bottom of the bar in said bracket when the bar is free of distortion from its normal shape.

9. In a bracket for mounting a railway brake beam safety bar, a channel-like bracket with depending flanges arranged to receive the safety bar between them, said flanges having alined apertures for mounting a bar positioning pin and one of said flanges extending downwardly and inwardly from the pin mounting end of the bracket to form a hook element for supporting a tool whereby the bar may be distorted to facilitate insertion and removal of its positioning pin.

ERNEST A. LE BEAU.